Jan. 9, 1945.  A. O. GROOMS  2,366,897
ATMOSPHERIC PRESSURE RESPONSIVE MEASURING DEVICE
Filed Sept. 2, 1942
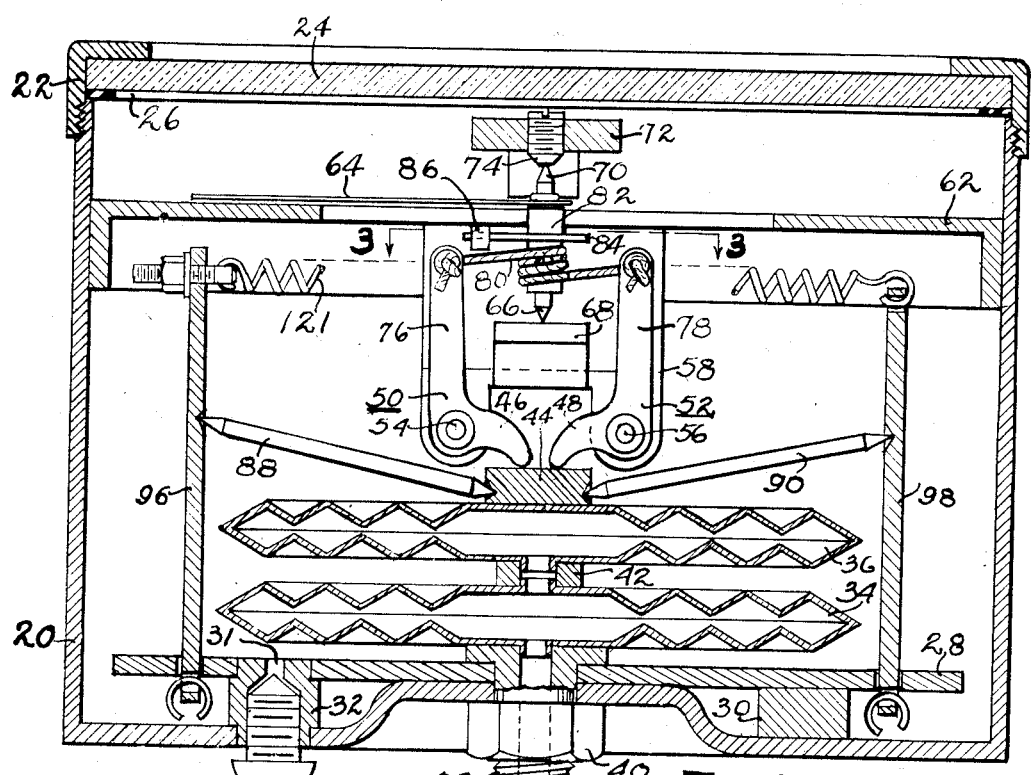
Fig.1.
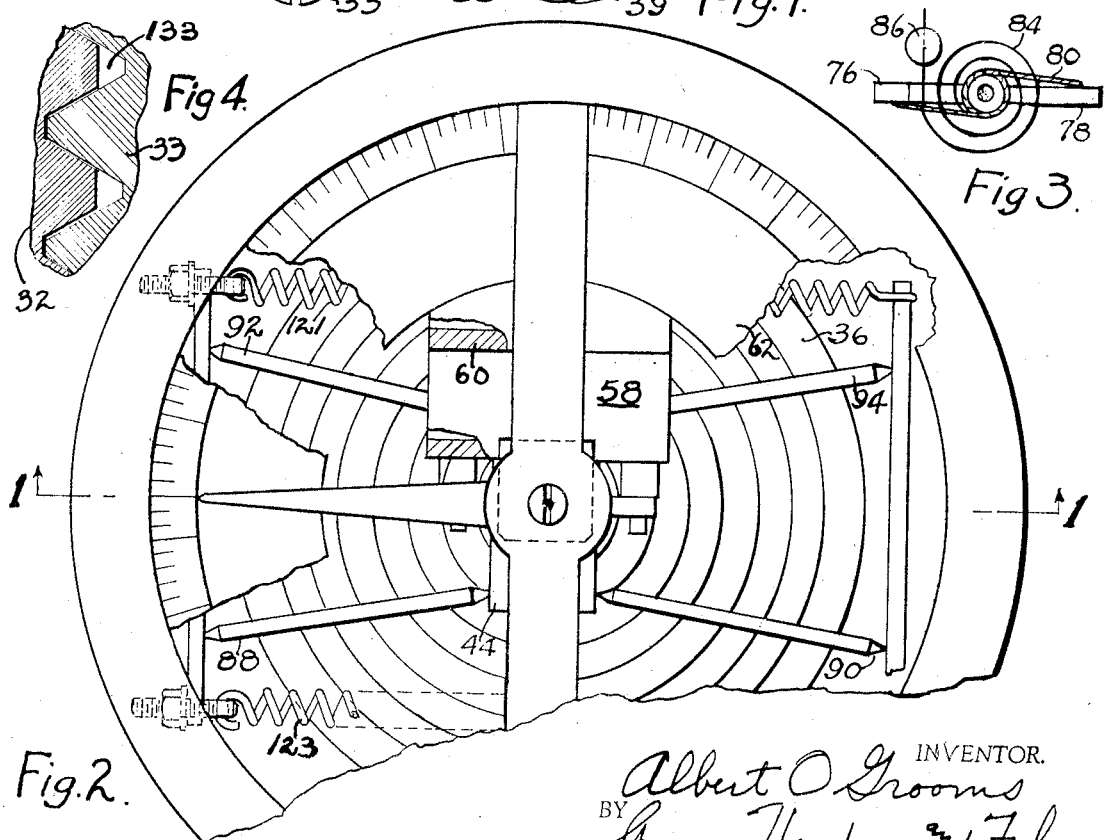
Fig.2.
Fig.3.
Fig.4.
INVENTOR.
Albert O. Grooms
BY Spencer Hardman and Fihr
attorneys Patented Jan. 9, 1945

2,366,897

UNITED STATES PATENT OFFICE 2,366,897

ATMOSPHERIC PRESSURE RESPONSIVE MEASURING DEVICE

Albert O. Grooms, Dayton, Ohio, assignor to General Motors Corporation, Dayton, Ohio, a corporation of Delaware Application September 2, 1942, Serial No. 457,016

4 Claims. (Cl. 73—179)

This invention relates to atmospheric pressure responsive measuring devices.

It is an object of my invention to provide a pressure responsive measuring instrument which is more accurate and sensitive than prior instruments.

It is another object of my invention to provide means by which one construction may be used for barometers, altimeters and rate of climb meters.

These objects are attained by compensating for the spring effect of the diaphragms of the instruments through a toggle device which applies a decreasing force with the expansion of the diaphragm. A screw, when seated, closes a passage converting the instrument to a barometer or altimeter. By unseating the screw, bleeding through the passage to the interior of the instrument is allowed thus converting the instrument to a rate of climb meter.

Further objects and advantages of the present invention will be apparent from the following description, reference being had to the accompanying drawing, wherein a preferred form of the present invention is clearly shown.

In the drawing:

Fig. 1 is a vertical sectional view of my improved meter taken along the line 1—1 of Fig. 2;

Fig. 2 is a top fragmentary view of the meter shown in Fig. 1, with a portion of the scale removed to show the interior construction;

Fig. 3 is a section taken along the line 3—3 of Fig. 1; and

Fig. 4 is a section of the threads of the screw 33 and the spacer 32.

Referring now more particularly to Fig. 1, there is shown a sealed casing 20 provided with a rim 22 threaded onto the bottom portion of the casing for holding the glass 24 in sealing engagement through the medium of the gasket seal 26, with the rim of the sealed casing 20. The bottom of the casing 20 is raised in its center portion to support a transverse supporting member 28. This transverse supporting member 28 is also supported by the block 30 and the spacer 32. Supported upon the support 28 is a double pancake diaphragm means including a lower diaphragm 34 and an upper diaphragm 36. The expansion of the upper diaphragm 36 augments the expansion of the lower diaphragm 34 and doubles the maximum stroke of the instrument. The lower diaphragm 34 on its lower side is provided with a threaded nipple 38 extending through central apertures in the support 28 and the bottom of the casing 20. The nipple 38 receives a nut 40 which fastens the diaphragm means to the bottom of the casing 20. Between the upper and lower diaphragms 36 and 34 is a collar 42 serving as a spacer, and providing communication between the interior of the diaphragms.

Upon the top of the diaphragm 36 is a block 44 upon which rests the arms 46 and 48 of the bell crank levers 50 and 52. These bell crank levers 50 and 52 are pivotally supported by the pins 54 and 56 which extend from downwardly turned ears of a cantilever support 58. The other end of the cantilever support is fastened to the side wall of the casing 20. It is braced by a vertical support 60 which extends upwardly to the dial supporting ring 62. The dial supporting ring 62 is provided with a dial face containing suitable markings and legends thereon. A pointer 64 cooperates with the dial and is mounted upon a lower conical bearing 66 which is supported by an upturned projection 68 of the cantilever support 58. The upper conical bearing 70 is supported by a cross member 72 which extends from one edge of the casing to the other and is provided with a set-screw 74 for adjusting the bearings.

In order to provide accurate and sensitive operation of the meter, the bell crank leaves 50 and 52 are provided with long upwardly extending arms 76 and 78. The upper end of the arm 76 is provided with an eyelet to which is connected a link chain or thread 80 which extends from the eyelet and is wrapped around a drum 82 provided upon the shaft of the pointer 64. After extending around the drum 82 one turn or more, the chain or thread is passed through an aperture in the drum and is wrapped in the opposite direction for one turn or more upon the drum, after which the end is fastened to an eyelet at the top of the arm 78. In order to keep thread 80 taut at all times and to keep the arms 46 and 48 in contact with upper diaphragm block 44, I provide a light spiral hair spring 84 having its inner end fastened to the drum 82 and its outer end fastened to a pin 86 upon the cantilever projection 58. This hair spring 84 exerts a slight tortional resistance to the unwinding of the thread 80.

I have found that the inherent resiliency or spring of the diaphragms reduces the sensitivity of this type of meter. These diaphragms normally operate under compression and therefore have an inherent spring or resilient force which is negative and which reduces as the diaphragm expands. I have found that the diaphragm means can be substantially compensated or partially compensated as desired by introducing a positive force which opposes the expansion of the diaphragm means and which reduces as the diaphragm means expands.

In order to do this I provide four toggle pins 88, 90, 92 and 94 which extend between the diaphragm block 44 and the levers 96 and 98 which are pivoted through a tongue loosely held in each of the slots provided in the support 28. Rings are provided to hold the tongues in the slots in the support 28. The ends of the toggle pins are conically pointed and rest in suitable conical recesses in the diaphragm block 44 and the levers 96 and 98. The toggle pins are splayed or spread so as to stabilize a vertical alignment of the diaphragm block 44. A plurality of tension springs 121 and 123 extend between the upper corners of the levers 96 and 98. These tension springs apply force to the toggle links which in turn provide a positive resultant force which opposes the expansion of the diaphragm means 36 and which decreases with the expansion of the diaphragm means.

These tension springs, levers and toggle pins eliminate any other springs which might be required to oppose the expansion of the diaphragm means 36. They also provide a decreasing positive force which compensates for the natural spring or resiliency of the diaphragm means so that the sensitivity of the instrument is considerably increased. For example, it is possible that when used as an altimeter that a change in elevation of two feet will provide the movement of the end of the pointer of one-sixteenth of an inch. This sensitivity may be increased by increasing compensation of the natural spring of the diaphragm means or it may be reduced by decreasing the amount of compensation. Thus this construction provides a means by which instruments of this type may be made very sensitive.

While I prefer to operate the meter with the diaphragm means under compression, it is also possible to use the meter with the diaphragm means under tension. When the diaphragm means are under tension, the toggle pins are inclined from the center downwardly so as to place these pins on the opposite side of the dead center or horizontal position of the pins from that shown in Fig. 1.

The spacer 32 is provided with a passage 31 leading to a seat which may be engaged by a conically pointed screw 33 which threads into the spacer 32 from the outside. When the screw 33 is screwed down onto its seat the interior of the casing is sealed from the external air and no air can be admitted to the interior of the casing. Air, however, is admitted to the interior of the diaphragm means through the passage 39 extending through the nipple 38. When the screw 33 is thus screwed down onto the seat the instrument may be used either as a barometer or as an altimeter by providing suitable indications upon the ring 62. As the air pressure rises, each of the diaphragms 34 and 36 will expand to raise the block 44 and pivot the bell crank levers 50 and 52 in opposite directions so that the arms 76 and 78 move away from each other to unwind the thread 80 from the drum 82 so as to turn the drum 82 and the pointer 64 in a clockwise direction as shown in Fig. 2. The toggle links 88 and 90 will provide a positive resistance to the expansion of the diaphragm means which will decrease with the increase in expansion. The meter may be changed for use at various altitudes by changing the absolute pressure or vacuum within the casing 20 through the passage 31 before the screw 33 is seated.

To change the instrument so that it can be used as a rate of climb meter, the screw 33 is unscrewed so as to remove it from its seat. The screw 33 is provided with a conventional U. S. standard thread but the aperture through the spacer 32 is larger than standard and will allow air to leak slowly through the passage 133 at the top of the tapped thread past the seat and through the passage 31 into the interior of the casing 20 when the pressure is greater outside the casing than inside and the reverse when the pressure is less outside the casing than inside. However, the outside air always has free access to the interior of the diaphragm means through the passage 39. When the instrument is used in an airplane or any device that climbs or falls, the pressure of the air will have ready communication with the interior of the diaphragm means but the communication with the interior of the casing 20 will be restricted so that the difference in pressures will cause an expansion of the diaphragm means which will be proportional to the rate of vertical movement or climb. Thus, by this simple change the instrument may be changed to a rate of climb meter. Obviously if it is never intended to use the instrument as a rate of climb meter the bushing 32 may be made solid so that the casing 20 will be sealed at all times.

While the form of embodiment of the invention as herein disclosed, constitutes a preferred form, it is to be understood that other forms might be adopted, all coming within the scope of the claims which follow.

What is claimed is as follows:

1. A measuring device comprising a diaphragm means, a pair of oppositely positioned bell crank levers each having an arm in operative connection with the diaphragm means, an indicating means provided with an operating drum, tension means wrapped about the drum and extending in opposite directions and connected to the other arms of the bell crank levers, and means for keeping the tension means taut.

2. In combination, a sealed casing, a fluid motor within the casing enclosing a space which is sealed from the remainder of the space in the interior of the casing, said casing being provided with a threaded passage connecting one of said spaces with the exterior of the casing, and a threaded adjusting screw threaded into said passage a variable amount, a portion of the top half of the threads of one of the threaded portions being left off with the bottom half of the threads remaining for providing a restricted passage of variable length into said one space.

3. A measuring device including a fluid motor incorporating a diaphragm means having an inherent increasing resistance to distortion as the fluid motor contracts from its unstressed condition, an indicating means, transmitting means for moving the indicating means in proportion to the distortion of the diaphragm means, and means for providing an increasing positive assistance to the distortion of the diaphragm means as the fluid motor contracts and the distortion of the diaphragm means increases from its unstressed condition and for providing a decreasing positive resistance to the reduction in distortion of the diaphragm means as the fluid motor expands and the diaphragm means approaches its unstressed condition.

4. A measuring device including a fluid motor incorporating a diaphragm means having a follower portion, an indicating means, transmitting means for moving the indicating means in proportion to the movement of the follower portion of the diaphragm means, a plurality of splayed toggle pins having their inner ends supported by said follower portion, said pins extending from the follower portion generally in opposite directions transversely to the path of movement of said follower portion, and resilient supporting means for resiliently supporting the outer ends of the toggle pins in a substantially fixed position and for applying a column loading to the toggle pins, the outer ends of said toggle pins being supported by and located by said resilient means in a plane transverse to and outside the path of movement of the inner ends of the toggle pins to place the sets of toggle pins at a slight angle to each other for the purpose of providing a component of force derived from said resilient means along the path of movement of the follower portion for controlling its movement.

ALBERT O. GROOMS.